United States Patent
Voss et al.

(10) Patent No.: US 8,934,742 B2
(45) Date of Patent: Jan. 13, 2015

(54) OPTICAL BEAM SWITCH

(75) Inventors: Andreas Voss, Stuttgart (DE); Thomas Rataj, Schweiz (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 119 days.

(21) Appl. No.: 13/341,054

(22) Filed: Dec. 30, 2011

(65) Prior Publication Data

US 2012/0128294 A1 May 24, 2012

Related U.S. Application Data (63) Continuation of application No. PCT/DE2010/050033, filed on May 27, 2010.

(30) Foreign Application Priority Data

Jun. 30, 2009 (DE) .......................... 10 2009 027 348

(51) Int. Cl.
*G02B 6/35* (2006.01)
*G02B 6/32* (2006.01)

(52) U.S. Cl.
CPC ............ *G02B 6/3504* (2013.01); *G02B 6/3534* (2013.01); *G02B 6/3528* (2013.01); *G02B 6/32* (2013.01); *G02B 6/3558* (2013.01)
USPC .............................................. 385/20; 385/22

(58) Field of Classification Search
USPC .................................................. 385/20–22
See application file for complete search history.

(56) References Cited

U.S. PATENT DOCUMENTS

| 4,223,978 | A | 9/1980 | Kummer et al. |
| 4,239,330 | A | 12/1980 | Ashkin et al. |
| 4,303,302 | A | 12/1981 | Ramsey et al. |
| 5,353,363 | A | 10/1994 | Keck et al. |
| 2002/0006247 | A1 | 1/2002 | Vaganov |
| 2002/0006547 | A1 | 1/2002 | Miyamoto |

FOREIGN PATENT DOCUMENTS

| CN | 1510447 A | 7/2004 |
| DE | 3214042 | 10/1983 |

(Continued)

OTHER PUBLICATIONS

International Search Report from corresponding PCT Application No. PCT/DE2010/050033, mailed Nov. 19, 2010, 3 pages.

(Continued)

*Primary Examiner* — Jerry Rahll
(74) *Attorney, Agent, or Firm* — Fish & Richardson P.C.

(57) ABSTRACT

An optical beam switch includes at least one input optical wave guide, multiple output optical wave guides and an optical switching element for selectively switching a light beam guided in the at least one input optical wave guide to one of the output optical wave guides, in which the switching element is between the at least one input optical waveguide and the multiple output optical waveguides. The optical switching element includes a beam propagation element and an optical focusing system, where the beam propagation element has two mutually opposed end faces and where either the beam propagation element or the optical focusing system can be deflected and/or twisted transversely to an optical axis. The at least one input optical wave guide is attached to a first end face of the beam propagation element, and the output optical wave guides are attached to a second end face.

41 Claims, 5 Drawing Sheets

(56) References Cited

FOREIGN PATENT DOCUMENTS

| EP | 0058789 | 2/1981 |
|---|---|---|
| JP | 1006916 | 1/1989 |

OTHER PUBLICATIONS

Notification of Transmittal of Translation of the International Preliminary Report on Patentability for corresponding PCT Application No. PCT/DE2010/050033, issued Jan. 17, 2012, 10 pages.

Office Action from the Chinese Patent Office for Application No. 201080035832.7, mailed Jun. 20, 2013, 15 pages, with German translation.

OPTICAL BEAM SWITCH

CROSS-REFERENCE TO RELATED APPLICATIONS

This application is a continuation of, and claims priority under 35 U.S.C. §120 to, PCT Application No. PCT/DE2010/050033, filed on May 27, 2010, which claimed priority to German Patent Application No. 10 2009 027 348.4, filed on Jun. 30, 2009. The contents of both of these priority applications are hereby incorporated by reference in their entirety.

BACKGROUND

U.S. Pat. No. 4,303,302 discloses an example of an optical beam switch in which a free fiber end of an input optical wave guide is deflected by means of a piezoelectric element, so that light is coupled in accordance with the deflection angle in different output optical guides. The free end of the input optical wave guide and the piezoelectric element together form an optical switching element. However, an air gap between the input and output optical guide leads to the following disadvantages: susceptibility of the beam switch to misalignment owing to aging and thermal effects; susceptibility of the beam switch to contamination and damage by dust and other impurities; and coupling losses owing to optical interfaces (for example, anti-reflective coatings at the air/optical guide transition).

SUMMARY

The present disclosure relates to optical beam switch devices and methods. In general, the present disclosure relates to 1) an optical beam switch having at least one input optical wave guide, multiple output optical wave guides, and an optical switching element which is provided therebetween for switching the light beam which is guided in the at least one input optical wave guide selectively to one of the output optical wave guides; or 2) an optical beam switch having multiple input optical wave guides, at least one output optical wave guide and an optical switching element which is provided therebetween for selectively switching a light beam guided in one of the input optical wave guides to the at least one output optical wave guide. In certain aspects, the optical beam switch is configured to prevent free beam propagation in air when switching between the multiple output or input optical wave guides.

In general, according to a first aspect, the subject matter of the present disclosure can be embodied in an optical beam switch includes, a beam propagation element, at least one input optical wave guide (input fiber) attached at one end of the beam propagation element, and multiple output optical wave guides (output fibers) attached to the opposite end of the beam propagation element. Switching between the output optical wave guides is achieved by selective deflection and/or twisting of the beam propagation element or by selective deflection and/or twisting of an optical focusing system arranged downstream of the beam propagation element.

Multiple alternative configurations for coupling to the output wave guide are possible. In a first configuration, referred to below as a first deflection principle, a common optical focusing system is used for all the output wave guides (for example, in the form of a GRIN fiber piece) to selectively couple to a particular output optical wave guide. The second configuration, referred to below as a second deflection principle, uses a separate optical focusing system for each output wave guide. The third configuration, referred to below as a twisting principle, can use both a common and a separate optical focusing system for each output wave guide. For the three configurations, different arrangements of the flexible beam propagation element and various geometric arrangements for the output wave guides are possible. A combination of the alternative principles is also possible in this context.

In the optical beam switch according to the first deflection principle, the input optical wave guide (input fiber) is attached at one end of the beam propagation element and the multiple output optical wave guides (output fibers) are attached at the opposing end of the beam propagation element. The output optical wave guides are attached substantially parallel with each other and perpendicularly to the end face of the beam propagation element in order to achieve linear beam guiding. The switching between the output optical wave guides, that is to say, the selection of the output optical wave guide desired in each case, is achieved by selective deflection of the end face of the beam propagation element attached to the output optical wave guide and/or an optical focusing system arranged downstream about one or more axes which are preferably provided in the region of that end of the beam propagation element at which the multiple output optical wave guides are provided.

In the optical beam switch according to the second deflection principle, the output optical wave guides are attached at a specific angle (the respective bending angle) with respect to the axis of the beam propagation element in order to achieve linear beam guiding. The switching between the output optical wave guides, that is to say, the selection of the output optical wave guide desired in each case, is achieved by selective deflection of the beam propagation element and/or an optical focusing system arranged downstream about one or more axes which are preferably provided in the region of that end of the beam propagation element at which the at least one input optical wave guide is provided. In addition, the beam propagation element of the beam switch may according to the second deflection principle have a diameter which is narrowed at one side, and which is preferably located in the region of the at least one axis so that, when the beam propagation element is deflected, the critical material loads and the bending-induced dual refraction (which may have a negative effect on achieving polarization and the coupling efficiency of the beam switch) are minimized. The diameter of the beam propagation element at the output side is increased in this instance with respect to the diameter at the input side. The narrowing of the beam propagation element is produced either by tapering (drawing a glass cylinder with axially variable diameter after processing by selective local heating above the softening temperature and controlled axial movement of the cylinder ends) or by selective grinding.

In the optical beam switch according to the twisting principle, the output optical wave guides are arranged in the twisting direction, that is to say, in a circular manner. This can be carried out both concentrically about the optical axis of the beam propagation element and eccentrically. In the case of concentric arrangement, the beam of the input optical wave guide is directed in accordance with the first or second deflection principle to one of the output optical wave guides. The output optical wave guides are attached to the beam propagation element in accordance with the first or second deflection principle used in each case. In the case of an eccentric arrangement, the output optical wave guides are attached substantially parallel with each other and perpendicularly to the end face of the beam propagation element in order to achieve linear beam guiding. Due to the eccentric arrangement of the output optical beam guides, previous deflection to couple the beam in one of the output wave guides can be prevented. The switching between the output optical wave guides, that is to say, the selection of the output optical wave guide desired in each case—based on one output optical wave guide—is achieved by selective twisting of the beam propagation element and/or selective twisting of an optical focusing system arranged downstream of the beam propagation element.

The at least one input optical wave guide is preferably attached by a collimation element to one end face of the beam propagation element and the output optical wave guides are attached by a common focusing element or separate focusing elements, respectively, to the other end face of the beam propagation element, for example, by splicing. In some implementations, the collimation and focusing elements include gradient index fiber pieces with a parabolic refractive index profile, which are also referred to as GRIN lenses. Attaching the multiple output wave guides to a focusing element may, for example, be carried out by direct splicing of the output wave guides to the focusing element, by splicing the output wave guides (which are fixed in a multiple capillary) with the focusing element or by splicing a multi-core fiber with the focusing element.

The entire free beam propagation consequently takes place in a single, monolithic element that includes highly transparent and effective material (e.g., quartz glass), without the guided light beam having to leave the optical wave guide or the material from which it or the cores thereof are made (e.g., quartz glass). Due to the omission of separate optical elements (lenses, mirrors, etc.) and the compact monolithic structure of the optical beam switch, the susceptibility of the beam switch to misalignments as a result of aging, thermal effects, dust/impurity contamination and damage can be drastically reduced. At the same time, coupling losses can be minimized by omitting optical interfaces (for example, anti-reflective coatings on the air/glass transition which is otherwise provided).

The joining of the beam propagation element to the focusing or collimation elements can be carried out by impact contact (so-called "optical contact") or alternatively by splicing. During impact contact, the beam propagation element and a focusing or collimation element are pressed against each other in an accurately fitting guide, taking into consideration the Hertzian compression, to produce a gap-free mechanical and optical contact in the region of the beam guide. This contact is preferably fixed in the guide with a low-viscosity adhesive agent, the adhesive not being intended to enter into the region of the beam guide, since it would impair the effectiveness of the joint location. With a beam switch according to the second deflection principle, it is also possible to use beam propagation elements with chamfered joining faces to join the beam propagation element to the focusing elements.

The beam propagation element and the focusing elements are joined together either directly or by intermediate elements. In the first instance, chamfered joining faces may be provided for mutual attachment between the output optical beam guides and the focusing elements and between the beam propagation element and the focusing elements. In the second case, there may be inserted in each case between the beam propagation element and the focusing elements a separate beam propagation intermediate element in which the light beam freely propagates. The intermediate beam propagation element may have chamfered attachment faces at one or both sides for attaching the beam propagation element and the focusing elements.

The optical beam switches according to the first and second deflection and twisting principle each also include a corresponding mechanical deflection or twisting device. This mechanical deflection or twisting device may be a receiving member for the optical beam switch which carries out the switching movement required for the respective switching principle. As drives for the switching movement, it is possible to use, for example, electromagnetic linear or rotary drives, piezoelectric actuators, pneumatic actuators or precision motors.

Choosing between the output optical wave guides, which can be arranged in a plane, can be performed using a (translatory or rotary) one-dimensional movement. However, due to the mechanical loads, which occur in the flexible beam propagation element and/or in an optical focusing system arranged downstream and which increase with the deflection, the number of output optical wave guides can be limited. A further increase in the number of output optical wave guides can be achieved by employing movement in two axes and arranging the output optical wave guides over a two-dimensional area that is perpendicular to the two axes in each case.

The first deflection principle has a number of advantages. For example, regardless of the number of output optical wave guides, a single focusing element can be used. Furthermore, the parallel orientation of the output optical wave guides, such as in a common multiple capillary, facilitates the beam guiding. Another advantage of a configuration having a multi-core fiber in place of multiple separate output optical wave guides is that the wave guides may be arranged very close beside each other, such that the required movements and forces can be minimized. In addition, it is also possible to integrate a very large number of output wave guides in one beam switch. With the same number of output optical wave guides, in the first deflection principle the mechanical loads and the dual refraction in the beam propagation element are typically lower than with a comparable beam switch in accordance with the second deflection principle.

According to a second aspect, the subject matter of this disclosure can be embodied in an optical beam switch that includes a beam propagation element, multiple input optical wave guides (input fibers) attached at one end of the beam propagation element, and at least one output optical wave guide (output fiber) attached at the opposite end of the beam propagation element. Switching of one of the input optical wave guides to the output optical wave guide, that is to say, selecting the desired input optical wave guide, is achieved by selective deflection and/or twisting of the beam propagation element and/or selective deflection and/or twisting of an optical collimation system that is arranged upstream of the beam propagation element.

Multiple alternative configurations, which differ in terms of the type of coupling in the beam propagation element are possible. For example, in a first configuration, referred to below as a first deflection principle, a common optical collimation system can be used for all the input wave guides (for example, in the form of a GRIN fiber piece) to couple to the beam propagation element. A second configuration, referred to below as the second deflection principle, uses a separate optical collimation system for each input wave guide. A third configuration, referred to below as the twisting principle, may use both a common and a separate optical collimation system for each input wave guide. The three principles—as will be described in greater detail below—result in different configurations of the flexible beam propagation element and various geometric arrangements for the input wave guides. A combination of the alternative principles is also possible in this instance.

In the optical beam switch according to the first deflection principle, the input optical wave guides (input fibers) are attached at one end of the beam propagation element and the output optical wave guide (output fiber) is attached at the opposing end of the beam propagation element. The input optical wave guides are attached substantially parallel with each other and perpendicularly to the end face of the beam propagation element in order to achieve linear beam guiding. The switching between the input optical wave guides, that is to say, the selection of the input optical wave guide desired in each case is achieved by selective bending or rotation of the end face of the beam propagation element attached to the input optical wave guides and/or selective bending or rotation of an optical collimation system arranged upstream of the beam propagation element about one or more axes. The axes can be provided in a region of the end of the beam propagation element at which the multiple input optical wave guides are provided.

In the optical beam switch according to the second deflection principle, the input optical wave guides are attached at a specific angle (the respective bending angle) with respect to the optical axis of the beam propagation element in order to achieve linear beam guiding. The switching between the input optical wave guides, that is to say, the selection of the input optical wave guide desired in each case, is achieved by selective deflection of the beam propagation element and/or selective deflection of an optical collimation system arranged upstream of the beam propagation element about one or more axes. The one or more axes can be provided in the region of that end of the beam propagation element at which the at least one output optical wave guide is provided.

In the optical beam switch according to the twisting principle, the input optical wave guides are arranged in a twisting direction, that is to say, in a circular manner. This can be carried out both concentrically about the optical axis of the beam propagation element and eccentrically. The switching between the input optical wave guides, that is to say, the selection of the input optical wave guide desired in each case, is achieved by selective twisting of the beam propagation element.

The input optical wave guides are preferably attached by a common collimation element or by a separate collimation element in each case to one end face of the beam propagation element. The output optical wave guide is attached by a focusing element to the other end face of the beam propagation element, e.g., by splicing. In some implementations, the collimation and focusing elements include gradient index fiber pieces with a parabolic refractive index profile, which are also referred to as GRIN lenses. Attaching the multiple input wave guides to a collimation element may, for example, be carried out by direct splicing of the input wave guides to the focusing element, by splicing the input wave guides which are fixed in a multiple capillary with the collimation element or by splicing a multi-core fiber with the collimation element.

Other advantages will be appreciated from the claims, the description and the drawings. The features set out above and those mentioned in greater detail below can also be used individually or together in any combination. The embodiments illustrated and described are not intended to be understood to be a definitive listing, but instead are of an exemplary nature to describe the invention.

DETAILED DESCRIPTION

Figure 1A:
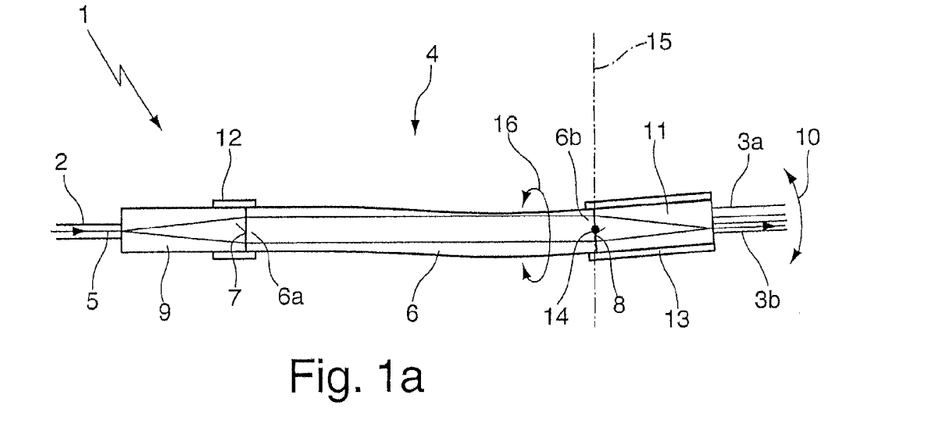
FIGS. 1a and 1b are schematics of examples of optical beam switches.
Figure 1B:
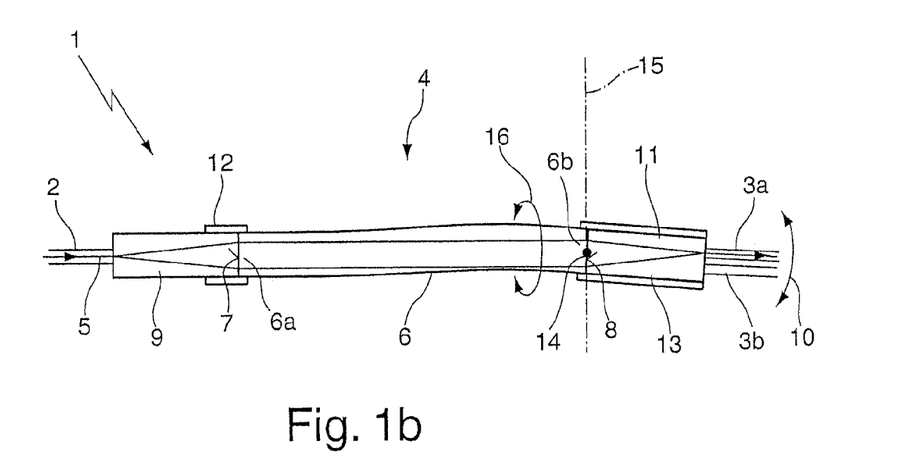
Figure 3A:
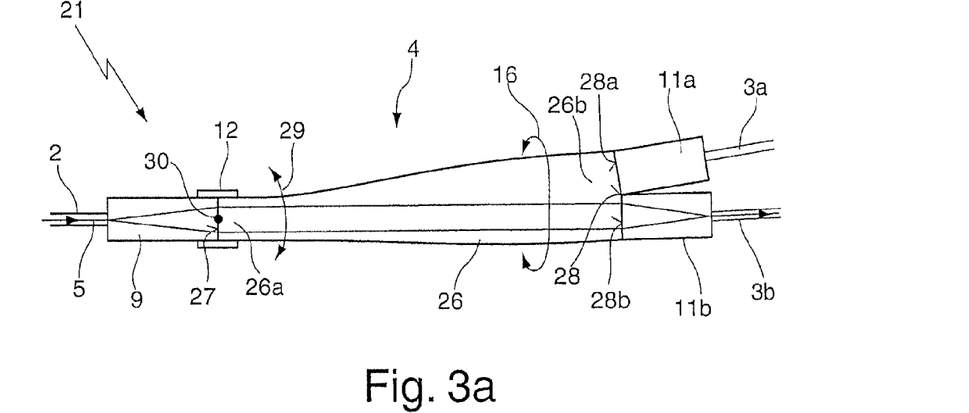
FIGS. 3a and 3b are schematics of examples of optical beam switches.
Figure 3B:
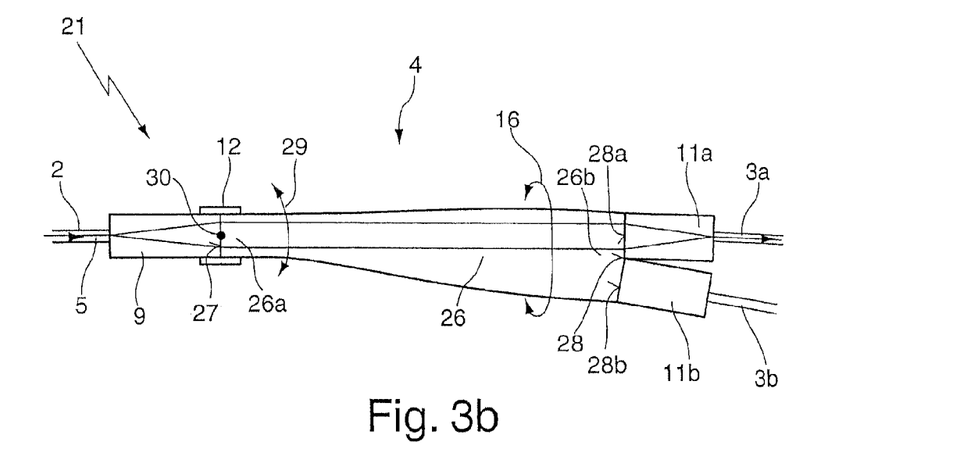

The optical beam switches 1, 21 illustrated in FIGS. 1 and 3 each include an input optical wave guide (for example, glass fibers) 2, two output optical wave guides (for example, glass fibers) 3a, 3b and an optical switching element 4 which is provided therebetween for switching a light beam 5 which is supplied in the input optical wave guide 2 selectively to one or the other output optical wave guide 3a, 3b. The two beam switches 1, 21 differ in terms of the type of coupling of the light beam 5 in the output optical wave guide 3a, 3b. The beam switch 1 operates in accordance with the so-called first deflection principle and uses a common optical focusing system for selective coupling in the output optical beam guides 3a, 3b, whilst the beam switch 21 operates in accordance with the so-called second deflection principle and uses a separate optical focusing system for each output optical wave guide 3a, 3b.

In the beam switch 1 illustrated in FIG. 1 according to the first deflection principle, the optical switching element 4 includes a cylindrical beam propagation element 6 which can be resiliently deflected transversely to the optical longitudinal axis thereof and which has two mutually opposed end faces 7, 8 and in which the light beam 5 freely propagates. The beam propagation element 6 comprises highly transparent and effective solid material, such as, for example, quartz glass. Alternatively, however, it is also conceivable to use hollow fibers.

The input optical wave guide 2 is attached by means of a gradient index collimation fiber piece 9 with a parabolic refractive index profile and with a suitable length (e.g., ¼ pitch) to the input end face 7 of the beam propagation element 6 by means of splicing. The gradient index collimation fiber piece 9 performs the function of a collimation lens and is referred to below as "GRIN collimation lens.". The output optical wave guides 3a, 3b are arranged beside each other in the deflection direction 10 of the beam propagation element 6 and attached to the output end face 8 of the beam propagation element 6 by means of a gradient index focusing fiber piece 11 with a parabolic refractive index profile and with a suitable length (e.g., ¼ pitch) by means of splicing. The gradient index focusing fiber piece 11 assumes the function of a focusing lens and is referred to below as a "GRIN focusing lens." The output optical wave guides 3a, 3b are joined substantially parallel with each other and perpendicularly to the output end face 8 of the beam propagation element 6 in order to achieve linear beam guiding.

The GRIN collimation lens 9 and the associated end 6a of the beam propagation element 6 are retained in a retention sleeve 12 which is fixed in position or adhesively-bonded therein. The GRIN focusing lens 11 and the associated end 6b of the beam propagation element 6 are retained or adhesively-bonded in a guiding sleeve 13 which is rotatably supported in the deflection direction 10 about an axis 14 which is provided in the region of the end 6b of the beam propagation element 6. The axis 14 is preferably located within the end 6b of the beam propagation element 6 which is retained by the guiding sleeve 13 and is in the plane of the output end face 8 of the beam propagation element 6 in FIG. 1.

The switching of the light beam 5 supplied in the input optical wave guide 2 between the output optical wave guides 3a, 3b is achieved by selective deflection of the guiding sleeve 13 and consequently the end 6b of the beam propagation element 6 and/or the GRIN focusing lens 11 which is arranged downstream about the axis 14. In the first switching position of the beam switch 1 illustrated in FIG. 1a, the light beam 5 is coupled in the output optical wave guide 3b and in the second switching position illustrated in FIG. 1b in the output optical wave guide 3a. The relationship of length and thickness of the beam propagation element 6 and/or the GRIN focusing lens 11 which is arranged downstream is sufficiently high to reliably prevent damage to the beam propagation element 6 and/or the GRIN focusing lens 11 which is arranged downstream, even in the case of frequent and long-term deflection.

The attachment of the two output wave guides 3a, 3b or multiple output wave guides to the GRIN focusing lens 11 can be carried out either by direct splicing of the output wave guides 3a, 3b to the GRIN focusing lens 11, by splicing the output wave guide 3a, 3b fixed in a multiple capillary with the GRIN focusing lens 11 or by splicing a multi-core fiber with the GRIN focusing lens 11. The parallel orientation of the output optical wave guides 3a, 3b facilitates the guiding thereof—for example, in a common multiple capillary. The configuration with a multi-core fiber instead of multiple separate output optical wave guides is particularly advantageous.

A further increase in the number of output optical wave guides can be achieved by using a movement in two axes, as indicated in FIG. 1 by the additional axis 15, and a two-dimensional arrangement of the output optical wave guides perpendicular to the two axes 14, 15, respectively. Alternatively or, as illustrated in FIG. 1, in addition to the deflection about the axes 14, 15, the beam propagation element 6 and/or the GRIN focusing lens 11 arranged downstream may also be able to be twisted about the longitudinal axis thereof, such that the output-side end 6b of the beam propagation element 6, including the GRIN focusing lens 11, can be rotated with respect to the input-side end 6a in the twisting direction 16. In the case of this twisting principle, the output optical wave guides are arranged offset in a twisting direction 16, and the switching between the output optical wave guides, that is to say, the selection of the output optical wave guide desired in each case, is achieved by selective twisting of the beam propagation element 6 and/or the GRIN focusing lens 11 arranged downstream.

Figure 2A:
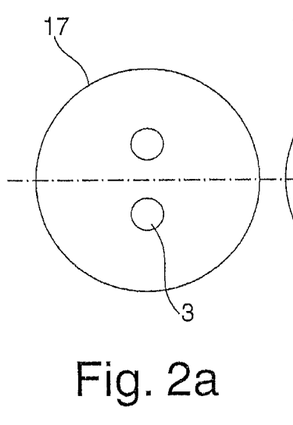
FIGS. 2a-2d are cross-section views of examples of different geometries for output fibers of an optical beam switch.
Figure 2B:
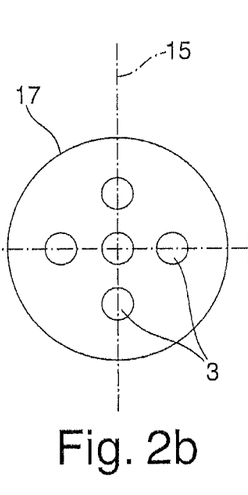
Figure 2C:
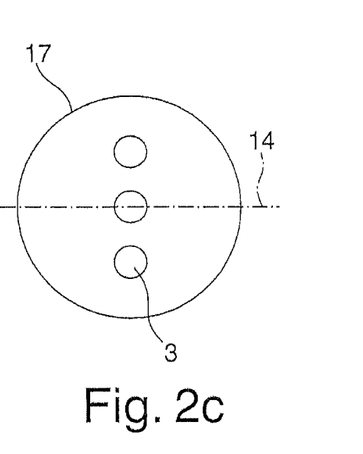
Figure 2D:
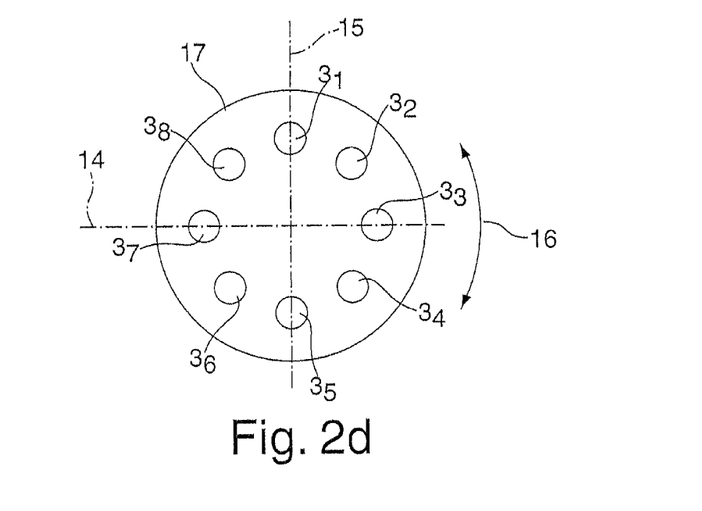

FIGS. 2a to 2c illustrate possible geometries of an output fiber 17 that is constructed as a multi-core fiber or as a fiber with multiple capillaries for a beam switch 1 according to the first deflection principle. In FIGS. 2a and 2c, two or three core fibers or capillaries 3 of the output fibers 17 are arranged in a line for a deflection of the beam propagation element 6 and/or the GRIN focusing lens 11 that is arranged downstream about a single axis 14. In FIG. 2b, five core fibers or capillaries 3 of the output fibers 17 are arranged in a two-dimensional manner for a deflection of the beam propagation element 6 and/or the GRIN focusing lens 11 that is arranged downstream about two axes 14, 15. FIG. 2d illustrates another possible geometry of an output fiber 17 that is constructed as a multi-core fiber or as a fiber with multiple capillaries for a beam switch 1 according to the combined first deflection and twisting principle. Eight capillaries 31 to 38 of the output fibers 17 are arranged concentrically around the fiber axis (twisting axis). The capillaries 31, 33, 35, 37 are selected by deflection of the beam propagation element 6 and/or the GRIN focusing lens 11, while the remaining capillaries 32, 34, 36, 37 can be selected by a combination of a deflection about one of the two axes 14, 15 and a twisting movement through 45°. Of course, the eight capillaries 31 to 38 can also be selected by selective twisting or a dual-axis deflection about the axes 14, 15 of the beam propagation element 6 and/or the GRIN focusing lens 11.

With the beam switch 21 illustrated in FIG. 3 according to the second deflection principle, the optical switching element 4 includes a conical beam propagation element 26 which can be resiliently bent transversely to the optical longitudinal axis thereof and which comprises highly transparent and effective solid material, such as, for example, quartz glass, and in which the light beam 5 freely propagates. The beam propagation element 26 narrows at one side with respect to the input end face 27. That is to say, the diameter of the beam propagation element 26 at the output end face 28 is enlarged with respect to the diameter at the input end face 27 so that, when the beam propagation element 26 is deflected about the axis 30 in the deflection direction 29, the critical material loads and the bending-induced dual refraction (which may have a negative effect on achieving polarization and the coupling efficiency of the beam switch 21) are minimized. The narrowing of the beam propagation element 26 can be achieved by means of tapering or by means of selective grinding.

The input optical wave guide 2 is attached by the GRIN collimation lens 9 to the input end face 27 of the beam propagation element 26 by splicing. The beam propagation element 26 has, at the output end face 28, two individually chamfered joining faces 28a, 28b for two GRIN focusing lenses 11a, 11b to which the output optical wave guides 3a, 3b (which are arranged beside each other in the deflection direction 29) are spliced in each case at right angles. The GRIN collimation lens 9 and the associated end 26a of the beam propagation element 26 are retained in the retaining sleeve 12 which is fixed in position or are adhesively bonded therein. The other free end 26b of the beam propagation element 26 is not clamped and can consequently be deflected in the deflection direction 29 about the axis 30, which is located within the retaining sleeve 12. The output optical wave guides 3a, 3b are arranged at a specific angle (the respective deflection angle) with respect to the optical axis of the beam propagation element 26 in order to achieve linear guiding of the light beam 5.

The switching of the light beam 5 supplied in the input optical wave guide 2 between the output optical wave guides 3a, 3b is achieved by selective deflection of the free end 26b of the beam propagation element 26 in the deflection direction 29. In the first switching position of the beam switch 21 illustrated in FIG. 3a, the light beam 5 is coupled in the output optical wave guide 3b and in the second switching position illustrated in FIG. 3b is coupled in the output optical wave guide 3a. The relationship of length and thickness of the beam propagation element 26 is sufficiently high to prevent damage to the beam propagation element 26, even in the case of frequent and long-term bending action.

In order to facilitate the deflection, the beam propagation element 26 may have a relatively thin central portion which is reduced in terms of cross-section. In the case of appropriate configuration of the relatively thin central portion, the bending action of the beam propagation element 26 may be limited to the relatively thin central portion. The use of the relatively thin central portion may reduce the bending-induced dual refraction in the beam propagation element 26 which may have a negative effect on obtaining polarization and the coupling efficiency of the optical beam switch.

As indicated in FIG. 3, even with the beam switch 21 according to the second deflection principle, the beam propagation element 26 may additionally be supported so as to be able to be twisted in the twisting direction 16. In some implementations, multiple output optical wave guides can be arranged offset in the twisting direction 16 and attached to each GRIN focusing lens 11a, 11b.

Figure 4:
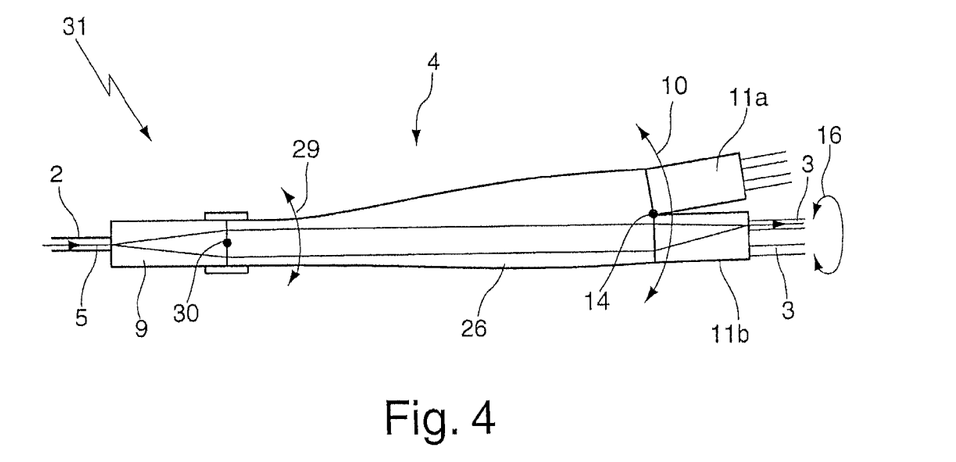
FIGS. 4-7 are schematics of examples of optical beam switches.

FIG. 4 illustrates a beam switch 31 according to the combined first and second deflection and twisting principles. The light beam 5 supplied in the input optical wave guide 2 is directed by means of a deflection 29 of the beam propagation element 26 about the axis 30 either into the upper GRIN focusing lens 11a or, as illustrated in FIG. 4, into the lower GRIN focusing lens 11b. Owing to a deflection 10 of the beam propagation element 26 and/or the GRIN focusing lenses 11a, 11b which are arranged downstream about the axis 14, the light beam 5 is directed inside the respective GRIN focusing lens 11a, 11b either downwards or, as shown in FIG. 4, upwards. The beam propagation element 26 can additionally be twisted in the twisting direction 16. In some implementations, there are attached to each GRIN focusing lens 11a, 11b multiple output optical wave guides 3 arranged offset in the twisting direction 16 and into which the light beam 5 can be directed in each case by twisting the beam propagation element 26.

The beam guiding in the beam switches 1, 21, 31 is carried out in a single monolithic element 6, 26 that includes a highly transparent and effective material. The light beam 5 does not leave the optical wave guide 2, 3a, 3b or the material from which the waveguides or the cores(s) thereof are produced (e.g., in most cases the material from which the wave guides are produced is quartz glass). Owing to the omission of separately adjustable optical elements (lenses, mirrors, etc.) and the compact monolithic structure, the susceptibility of the beam switch 1, 21, 31 with respect to misalignments owing to ageing and thermal effects and with respect to contamination and damage by dust and other impurities is drastically reduced. At the same time, owing to the omission of optical interfaces (for example, anti-reflective coatings on the air/glass transition which is otherwise provided), coupling losses can be minimized.

The beam switches 1, 21, 31 illustrated in FIGS. 1 to 4 can also be used for a transposed application, in which one light beam which guided in one of multiple input optical wave guides is switched to an output optical wave guide, as will be described below with reference to FIGS. 5 to 7.

Figure 5:
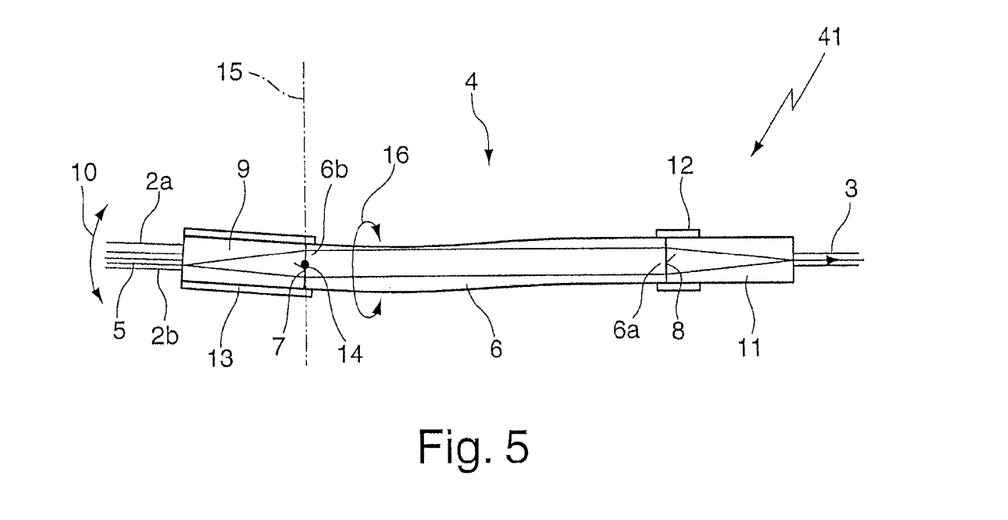

The beam switch 41 illustrated in FIG. 5 corresponds to the beam switch 1 operated in the opposite direction. In the beam switch 41, the two input optical wave guides 2a, 2a are attached by a GRIN collimation lens 9 to one end face 7 of the beam propagation element 6 and the one output optical beam guide 3 is attached by a GRIN focusing lens 11 to the other end face 8. The light beam 5 supplied in each case through one of the input optical wave guides 2a, 2b can be further directed about the axis 14 into the output optical wave guide 3 by deflection 10 of the beam propagation element 6 and/or the GRIN collimation lens 9 arranged upstream. In a similar manner to the beam switch 1, when the input optical wave guides are arranged accordingly, the desired input optical wave guide can also be selected by means of twisting 16 of the beam propagation element 6 and/or the GRIN collimation lens 9 which is arranged upstream.

Figure 6:
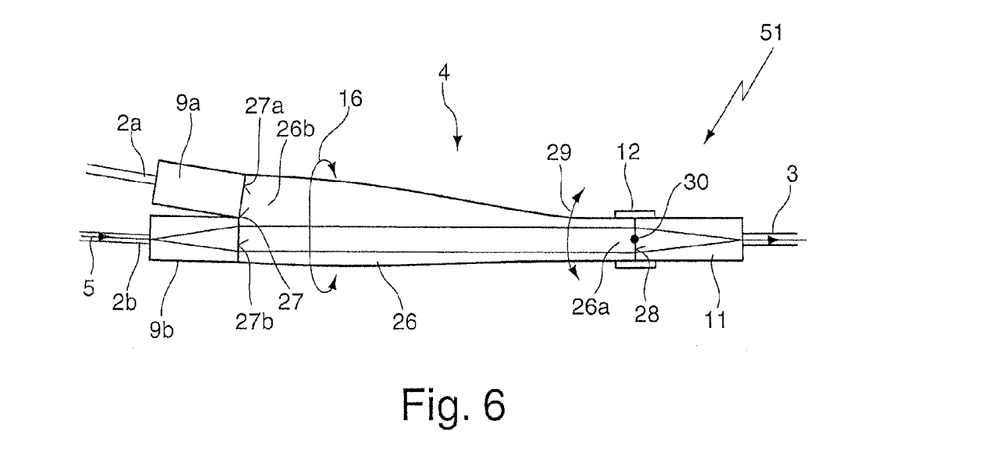

The beam switch 51 illustrated in FIG. 6 corresponds to the beam switch 21 operated in the opposite direction. In the beam switch 51, the two input optical wave guides 2a, 2a are each attached by a GRIN collimation lens 9a, 9b to the joint faces 27a, 27b of the one end face 27 of the beam propagation element 26 and the one output optical wave guide 3 is attached by a GRIN focusing lens 11 to the other end face 28. The light beam 5 which is supplied in each case through one of the input optical wave guides 2a, 2b can be further directed about the axis 30 into the output optical wave guide 3 by deflection 29 of the beam propagation element 26 and/or the GRIN collimation lens 9a, 9b which is arranged upstream. In a similar manner to the beam switch 21, when the input optical wave guides are arranged accordingly, the desired input optical wave guide can also be selected by twisting 16 of the beam propagation element 26 and/or the GRIN collimation lens 9a, 9b which is arranged upstream.

Figure 7:
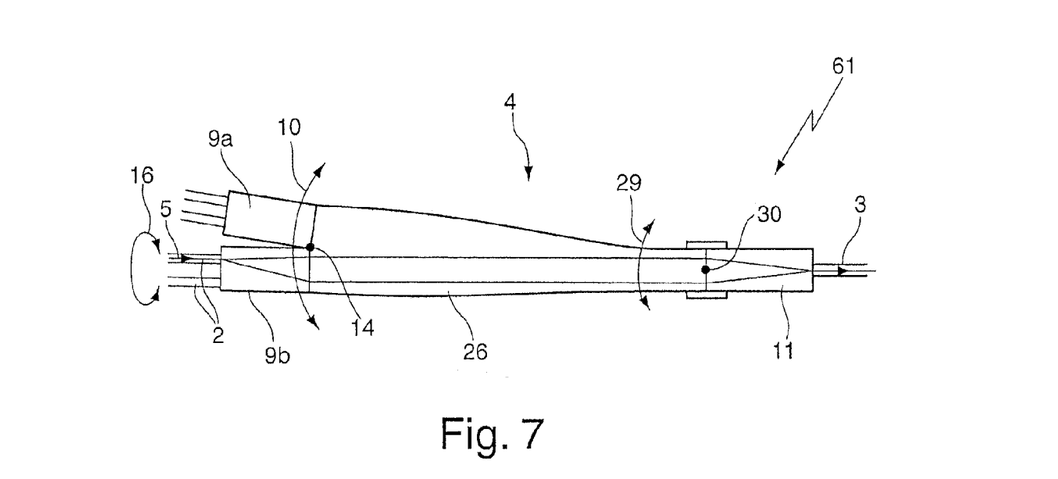

The beam switch 61, which is illustrated in FIG. 7, corresponds to the beam switch 31 operated in the opposite direction so that a description of the individual components is omitted. With the beam switch 61, the light beam 5 that is supplied in each case through one of the input optical wave guides 2 can be further directed into the one output optical wave guide 3 by twisting 16 of the beam propagation element 26 and/or the GRIN collimation lens 9a, 9b which is arranged upstream and deflection 10, 29 of the beam propagation element 26 and/or the GRIN collimation lenses 9a, 9b which are arranged upstream about the axes 14, 30.

A number of embodiments have been described. Nevertheless, it will be understood that various modifications may be made without departing from the spirit and scope of the invention. Accordingly, other embodiments are within the scope of the following claims.

What is claimed is:

1. An optical beam switch comprising:
at least one input optical wave guide;
a plurality of output optical wave guides; and
an optical switching element between the at least one input optical wave guide and the plurality of output optical wave guides, wherein the optical switching element is configured to selectively switch a light beam that is guided in any one of the at least one input optical wave guide to any one of the output optical wave guides, the optical switching element comprises a beam propagation element having two mutually opposed end faces and an optical focusing system downstream of the beam propagation element, and wherein the beam propagation element or the optical focusing system is operable to be deflected transversely to an optical axis or torsionally twisted about the optical axis,
wherein the beam propagation element comprises a transparent solid material,
wherein the at least one input optical wave guide is attached directly or by an optical collimation system to a first end face of the beam propagation element, and
wherein the output optical wave guides are arranged beside each other in at least one deflection direction or a twisting direction, and are attached directly or by the optical focusing system to a second end face of the beam propagation element.

2. An optical beam switch according to claim 1, wherein the optical collimation system comprises a collimation element arranged upstream of the beam propagation element.

3. An optical beam switch according to claim 2, wherein the collimation element comprises a gradient index collimation fiber piece.

4. An optical beam switch according to claim 1, wherein the optical focusing system comprises a common focusing element.

5. An optical beam switch according to claim 4, wherein the common focusing element comprises a gradient index focusing fiber piece.

6. An optical beam switch according to claim 1, wherein the optical focusing system comprises a plurality of separate focusing elements and each output optical wave guide is attached by a corresponding separate focusing element to the second end face of the beam propagation element.

7. An optical beam switch according to claim 6, wherein each focusing element comprises a gradient index focusing fiber piece.

8. An optical beam switch according to claim 1, wherein the transparent solid material comprises quartz glass.

9. An optical beam switch according to claim 1, wherein at least one of the beam propagation element, the at least one input optical wave guide, or the output optical wave guides have chamfered joining faces.

10. An optical beam switch according to claim 1, wherein the plurality of output optical wave guides extend parallel with each other.

11. An optical beam switch according to claim 1, wherein the beam propagation element is supported so as to be able to be deflected about at least one axis and the plurality of output optical wave guides are arranged in a line which extends perpendicularly to the at least one axis.

12. An optical beam switch according claim 1, wherein the beam propagation element is supported so as to be able to be deflected about two axes which extend perpendicularly to each other and the plurality of output optical wave guides extend along a direction perpendicular to the two axes.

13. An optical beam switch according to claim 1, wherein at least one deflecting axis is in a region of an end of the beam propagation element at which the at least one input optical wave guide is provided.

14. An optical beam switch according to claim 1, wherein at least one deflecting axis is in a region of an end of the beam propagation element at which the plurality of output optical wave guides are provided.

15. An optical beam switch according to claim 1, comprising the optical focusing system, wherein each of the optical collimation system and the optical focusing system comprises an element having a parabolic refractive index profile.

16. An optical beam switch according to claim 1, wherein the plurality of output optical wave guides comprise capillaries of a multi-capillary fiber or by fibers of a multi-core fiber.

17. An optical beam switch according to claim 1, comprising the optical focusing system, wherein the optical collimation system and the optical focusing system are each spliced to the beam propagation element.

18. An optical beam switch comprising:
a plurality of input optical wave guides;
at least one output optical wave guide; and
an optical switching element between the plurality of input optical wave guides and the at least one output optical wave guide, wherein the optical switching element is configured to selectively switch a light beam guided in any one of the input optical wave guides to any one of the at least one output optical wave guide,
wherein the optical switching element comprises a beam propagation element having two mutually opposed end faces and/or an optical collimation system, wherein the beam propagation element or the optical collimation system is operable to be deflected transversely to an optical axis or torsionally twisted about the optical axis,
wherein the beam propagation element comprises a transparent solid material,
wherein the input optical wave guides are arranged beside each other in at least one deflection direction or a twisting direction of the beam propagation element or of the optical collimation system and are attached directly or by the optical collimation system to a first end face of the beam propagation element, and
wherein the at least one output optical wave guide is attached directly or by an optical focusing system to a second end face of the beam propagation element.

19. An optical beam switch according to claim 18, comprising the optical collimation system, wherein the optical collimation system comprises a common collimation element arranged upstream of the beam propagation element.

20. An optical beam switch according to claim 19, wherein the common collimation element comprises a gradient index collimation fiber piece.

21. An optical beam switch according to claim 18, wherein each of the input optical wave guides is attached by a separate collimation element to the first end face of the beam propagation element.

22. An optical beam switch according to claim 21, wherein each separate collimation element comprises a gradient index collimation fiber piece.

23. An optical beam switch according to claim 18, wherein the optical focusing system comprises a focusing element arranged downstream of the beam propagation element.

24. An optical beam switch according to claim 23, wherein the focusing element comprises a gradient index focusing fiber piece.

25. An optical beam switch according to claim 18, comprising the optical collimation system, wherein each of the optical collimation system and the optical focusing system comprises an element having a parabolic refractive index profile.

26. An optical beam switch according claim 18, wherein the beam propagation element is supported so as to be able to be deflected about two axes which extend perpendicularly to each other and the plurality of input optical wave guides extend along a direction perpendicular to the two axes.

27. An optical beam switch according to claim 18, comprising the optical collimation system, wherein the optical collimation system and the optical focusing system are each spliced to the beam propagation element.

28. An optical beam switch according to claim 13, wherein at least one deflecting axis is in a region of an end of the beam propagation element at which the at least one output optical wave guide is provided.

29. An optical beam switch according to claim 18, wherein at least one of the beam propagation element, the input optical wave guides, or the at least one output optical wave guide have chamfered joining faces.

30. An optical beam switch according to claim 18, wherein at least one deflecting axis is in a region of an end of the beam propagation element at which the plurality of input optical wave guides are provided.

31. An optical beam switch according to claim 18, wherein the plurality of input optical wave guides extend parallel with each other.

32. An optical beam switch according to claim 18, wherein the plurality of input optical wave guides comprise capillaries of a multi-capillary fiber or fibers of a multi-core fiber.

33. An optical beam switch according to claim 18, wherein the beam propagation element is supported so as to be able to be deflected about at least one axis and the plurality of input optical wave guides are arranged in a line which extends perpendicularly to the at least one axis.

34. An optical beam switch according to claim 18, wherein the transparent solid material comprises quartz glass.

35. An optical beam switch comprising:
a plurality of input optical wave guides;
at least one output optical wave guide; and
an optical switching element between the plurality of input optical wave guides and the at least one output optical wave guide, wherein the optical switching element is configured to selectively switch a light beam guided in any one of the input optical wave guides to any one of the at least one output optical wave guide, wherein the optical switching element comprises a beam propagation element having two mutually opposed end faces and/or an optical collimation system, wherein the beam propagation element is operable to be deflected transversely to an optical axis or twisted about the optical axis, wherein the input optical wave guides are arranged beside each other in at least one deflection direction or in a twisting direction of the beam propagation element or of the optical collimation system and are attached directly or by the optical collimation system to a first end face of the beam propagation element, wherein the at least one output optical wave guide is attached directly or by an optical focusing system to a second end face of the beam propagation element, and wherein the beam propagation element is supported so as to be able to be deflected about at least one axis and the plurality of input optical wave guides are arranged in a line which extends perpendicularly to the at least one axis.

36. An optical beam switch comprising:
at least one input optical wave guide;
a plurality of output optical wave guides; and
an optical switching element between the at least one input optical wave guide and the plurality of output optical wave guides, wherein the optical switching element is configured to selectively switch a light beam that is guided in any one of the at least one input optical wave guide to any one of the output optical wave guides, wherein the optical switching element comprises a beam propagation element having two mutually opposed end faces, and wherein the beam propagation element is operable to be deflected transversely to an optical axis or torsionally twisted about the optical axis, wherein the beam propagation element comprises a transparent solid material, wherein the at least one input optical wave guide is attached directly or by an optical collimation system to a first end face of the beam propagation element, and wherein the output optical wave guides are arranged beside each other in at least one deflection direction or a twisting direction, and are attached directly or by an optical focusing element to a second end face of the beam propagation element.

37. An optical beam switch comprising:
at least one input optical wave guide;
a plurality of output optical wave guides; and
an optical switching element between the at least one input optical wave guide and the plurality of output optical wave guides, wherein the optical switching element is configured to selectively switch a light beam that is guided in the at least one input optical wave guide to any one of the output optical wave guides, and the optical switching element comprises a beam propagation element having two mutually opposed end faces and an optical focusing system downstream of the beam propagation element, wherein the beam propagation element or the optical focusing system is operable to be deflected transversely to an optical axis or twisted about the optical axis, wherein the at least one input optical wave guide is attached directly or by an optical collimation system to a first end face of the beam propagation element, wherein the output optical wave guides are arranged beside each other in at least one deflection direction or a twisting direction, and are attached by the optical focusing system to a second end face of the beam propagation element, and wherein the optical focusing system comprises a plurality of separate focusing elements and each output optical wave guide is attached by a corresponding separate focusing element to the second end face of the beam propagation element.

38. An optical beam switch comprising:
a plurality of input optical wave guides;
at least one output optical wave guide; and
an optical switching element between the plurality of input optical wave guides and the at least one output optical wave guide, wherein the optical switching element is configured to selectively switch a light beam guided in any one of the input optical wave guides to any one of the at least one output optical wave guide, wherein the optical switching element comprises a beam propagation element having two mutually opposed end faces and an optical collimation system, wherein the beam propagation element or the optical collimation system is operable to be deflected transversely to an optical axis or twisted about the optical axis, wherein the input optical wave guides are arranged beside each other in at least one deflection direction or in a twisting direction of the beam propagation element or the optical collimation system and are attached by the optical collimation system to a first end face of the beam propagation element, wherein the at least one output optical wave guide is attached directly or by an optical focusing system to a second end face of the beam propagation element, and wherein each of the input optical wave guides is attached by a separate collimation element of the optical collimation system to the first end face of the beam propagation element.

39. An optical beam switch comprising:
at least one input optical wave guide;
a plurality of output optical wave guides;
an optical switching element between the at least one input optical wave guide and the plurality of output optical wave guides, wherein the optical switching element is configured to selectively switch a light beam that is guided in any one of the at least one input optical wave guide to any one of the output optical wave guides, and the optical switching element comprises a beam propagation element having two mutually opposed end faces and an optical focusing system downstream of the beam propagation element, wherein the beam propagation element or the optical focusing system is operable to be deflected transversely to an optical axis or twisted about the optical axis; and an optical collimation system, wherein the at least one input optical wave guide is attached by the optical collimation system to a first end face of the beam propagation element, wherein the output optical wave guides are arranged beside each other in at least one deflection direction or a twisting direction, and are attached by the optical focusing system to a second end face of the beam propagation element, and wherein the optical collimation system and the optical focusing system are each spliced to the beam propagation element.

40. An optical beam switch comprising:
a plurality of input optical wave guides;
at least one output optical wave guide;
an optical switching element between the plurality of input optical wave guides and the at least one output optical wave guide, wherein the optical switching element is configured to selectively switch a light beam guided in any one of the input optical wave guides to any one of the at least one output optical wave guide,
wherein the optical switching element comprises a beam propagation element having two mutually opposed end faces and an optical collimation system, wherein the beam propagation element or the optical collimation system is operable to be deflected transversely to an optical axis or twisted about the optical axis,
wherein the input optical wave guides are arranged beside each other in at least one deflection direction or in a twisting direction of the beam propagation element or the optical collimation system and are attached by the optical collimation system to a first end face of the beam propagation element; and
an optical focusing system,
wherein the at least one output optical wave guide is attached by the optical focusing system to a second end face of the beam propagation element, and
wherein optical collimation system and the optical focusing system are each spliced to the beam propagation element.

41. An optical beam switch comprising:
at least one input optical wave guide;
a plurality of output optical wave guides; and
an optical switching element between the at least one input optical wave guide and the plurality of output optical wave guides, wherein the optical switching element is configured to selectively switch a light beam that is guided in any one of the at least one input optical wave guide to any one of the output optical wave guides, and the optical switching element comprises a beam propagation element having two mutually opposed end faces and an optical focusing system downstream of the beam propagation element, wherein the beam propagation element is operable to be deflected transversely to an optical axis or twisted about the optical axis,
wherein the at least one input optical wave guide is attached directly or by an optical collimation system to a first end face of the beam propagation element,
wherein the output optical wave guides are arranged beside each other in at least one deflection direction or a twisting direction, and are attached directly or by the optical focusing system to a second end face of the beam propagation element, and
wherein the beam propagation element is supported so as to be able to be deflected about at least one axis and the plurality of output optical wave guides are arranged in a line which extends perpendicularly to the at least one axis.

* * * * *

UNITED STATES PATENT AND TRADEMARK OFFICE
CERTIFICATE OF CORRECTION

PATENT NO.        : 8,934,742 B2
APPLICATION NO.   : 13/341054
DATED             : January 13, 2015
INVENTOR(S)       : Andreas Voss et al.

It is certified that error appears in the above-identified patent and that said Letters Patent is hereby corrected as shown below:

In the Claims

In Claim 25, column 11, line 19, delete "according claim" and insert --according to claim--.

In Claim 26, column 12, line 27, delete "according claim" and insert --according to claim--.

Signed and Sealed this
Twenty-third Day of June, 2015

Michelle K. Lee
*Director of the United States Patent and Trademark Office*